(12) United States Patent
Bjornberg et al.

(10) Patent No.: US 6,389,126 B1
(45) Date of Patent: *May 14, 2002

(54) SERVICE PROVISIONING SYSTEM FOR INTERACTIVE VOICE RESPONSE SERVICES

(75) Inventors: Greg Bjornberg; Dale Cobb; David Phelps, all of Colorado Springs; Phyllis D. Santa, Larkspur, all of CO (US)

(73) Assignee: MCI Communications Corporation, Washington, DC (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/074,050

(22) Filed: May 7, 1998

(51) Int. Cl.[7] .......................... H04M 1/64; H04M 11/00; H04M 3/42
(52) U.S. Cl. ................................ 379/201.03; 379/67.1; 379/88.22; 379/201.12; 379/100.05; 379/207.02
(58) Field of Search .......................... 379/67.1, 88.01, 379/88.13, 88.17, 88.19, 91.01, 93.21, 100.12, 100.15, 115, 88.22, 133, 144, 100.05, 158, 196, 201.03, 219, 201.12, 220, 265, 34, 352, 9, 27, 155, 207.02, 207.11; 455/403, 415, 461; 340/825.7, 825.8, 826; 709/234, 236, 237; 707/1–10, 200–206

(56) References Cited

U.S. PATENT DOCUMENTS

| 4,797,910 A | 1/1989 | Daudelin ..................... 379/67 |
| 4,845,739 A | 7/1989 | Katz ........................... 379/92 |

(List continued on next page.)

OTHER PUBLICATIONS

Stallings, William, 1995, ISDN and Broadband ISDN with Frame Relay and ATM, 3rd edition, pp. 257–277.
Emerson, S. Thomas, "Voice Response Systems—Technology to the Rescue for Business Users", Speech Technology, pp. 99–103 (Jan./Feb. 1983).
Hester, et al., "The AT&T Multi–Mode Voice Systems—Full Spectrum Solutions for Speech Processing Applications", Proceedings of the 1985 AVIOS Conference, pp. 1, 3, 5, 7 and 9 (Sep. 1985).
Moosemiller, John P., "AT&T's Conversant I Voice System", Speech Technology, pp. 88, 90 and 92 (Mar./Apr. 1986).
Perdue, Robert J. and Eugene L. Rissanon, "Conversant 1 Voice System Architecture and Applications," AT&T Technical Journal, pp. 34–47 (Sep./Oct. 1986).

* cited by examiner

Primary Examiner—Allan Hoosain (57) ABSTRACT

A system and method for provisioning application and data files to a plurality of real-time processing nodes within a telecommunications network. The system comprises a user interface for accepting commands from a user to deactivate, activate, deploy, or delete application and data files, an application database for storing the application and data files, and an interface to monitor the operational state of the plurality of real-time processing nodes. The method includes the steps of using a plurality of state tables to monitor the state of the application and data files and deploying the application and data files to the plurality of real-time processing nodes according to commands received from the user interface, the plurality of state tables, and the operational state of the nodes. The invention is particularly suited to provisioning a network of advanced interactive voice response (IVR) service platforms with customer IVR application and data files.

18 Claims, 6 Drawing Sheets

NGSN Data Distribution Network

U.S. PATENT DOCUMENTS

| Patent | | Date | Inventor | Class |
|---|---|---|---|---|
| 4,930,150 | A | 5/1990 | Katz | 379/93 |
| 5,048,075 | A | 9/1991 | Katz | 379/92 |
| 5,128,984 | A | 7/1992 | Katz | 379/92 |
| 5,133,004 | A * | 7/1992 | Heileman, Jr. et al. | 379/67.1 |
| 5,165,095 | A | 11/1992 | Borcherding | 379/88.03 |
| 5,185,781 | A | 2/1993 | Dowden et al. | 379/88.04 |
| 5,251,252 | A | 10/1993 | Katz | 379/92 |
| 5,255,309 | A | 10/1993 | Katz | 379/88 |
| 5,259,023 | A | 11/1993 | Katz | 379/88 |
| 5,325,421 | A | 6/1994 | Hou et al. | 379/88.03 |
| 5,349,633 | A | 9/1994 | Katz | 379/88 |
| 5,351,285 | A | 9/1994 | Katz | 379/94 |
| 5,519,772 | A * | 5/1996 | Akman et al. | 379/265 |
| 5,533,115 | A * | 7/1996 | Hollenbach et al. | 379/220 |
| 5,553,119 | A | 9/1996 | McAllister et al. | 379/88.01 |
| 5,561,707 | A | 10/1996 | Katz | 379/88 |
| 5,572,583 | A | 11/1996 | Wheeler, Jr. et al. | 371/221.09 |
| 5,581,600 | A | 12/1996 | Watts et al. | 379/88.02 |
| 5,583,920 | A * | 12/1996 | Wheeler, Jr. | 379/88.13 |
| 5,692,033 | A | 11/1997 | Farris | 379/67.1 |
| 5,742,905 | A | 4/1998 | Pepe et al. | 455/461 |
| 5,793,771 | A | 8/1998 | Darland et al. | 370/467 |
| 5,802,146 | A * | 9/1998 | Dulman | 379/34 |
| 5,805,675 | A | 9/1998 | Chanda | 379/93.14 |
| 5,818,921 | A | 10/1998 | Vander Meiden et al. | 379/225 |
| 5,825,752 | A | 10/1998 | Fujimori et al. | 370/260 |
| 5,854,834 | A | 12/1998 | Gottlieb et al. | 379/114.04 |
| 5,867,494 | A | 2/1999 | Krishnaswamy et al. | 370/352 |
| 5,881,131 | A * | 3/1999 | Farris et al. | 379/27 |
| 5,881,135 | A | 3/1999 | Watts et al. | 379/88.02 |
| 5,915,008 | A * | 6/1999 | Dulman | 379/201 |
| 5,917,900 | A | 6/1999 | Allison et al. | 379/229 |
| 5,920,562 | A | 7/1999 | Christie et al. | 370/395 |
| 5,923,659 | A | 7/1999 | Curry et al. | 370/401 |
| 5,923,859 | A | 7/1999 | Melo et al. | 710/113 |
| 5,926,524 | A | 7/1999 | Taylor | 379/88.08 |
| 5,930,348 | A | 7/1999 | Regnier et al. | 379/221 |
| 5,931,914 | A | 8/1999 | Chiu | 709/230 |
| 5,946,386 | A | 8/1999 | Rogers et al. | 379/265.09 |
| 5,953,389 | A * | 9/1999 | Pruett et al. | 379/9 |
| 5,956,396 | A | 9/1999 | Ash et al. | 379/220.01 |
| 5,974,252 | A | 10/1999 | Lin et al. | 379/220.01 |
| 5,987,118 | A | 11/1999 | Dickerman et al. | 717/1 |
| 5,987,331 | A | 11/1999 | Grube et al. | 455/509 |
| 5,995,610 | A | 11/1999 | Smidt et al. | 379/207.02 |
| 5,999,525 | A | 12/1999 | Krishnaswamy et al. | 370/352 |
| 6,003,031 | A | 12/1999 | Hartikainen et al. | 707/10 |
| 6,014,428 | A | 1/2000 | Wolf | 379/88.11 |
| 6,018,567 | A * | 1/2000 | Dulman | 379/34 |
| 6,038,293 | A | 3/2000 | McNerney et al. | 379/88.19 |
| 6,041,325 | A * | 3/2000 | Shah et al. | 707/10 |
| 6,044,142 | A | 3/2000 | Hammarstrom et al. | 379/223 |
| 6,044,144 | A | 3/2000 | Becker et al. | 379/265.02 |
| 6,044,259 | A * | 3/2000 | Hentila et al. | 455/406 |
| 6,081,591 | A | 6/2000 | Skoog | 379/230 |
| 6,104,803 | A | 8/2000 | Weser et al. | 379/230 |
| 6,108,410 | A | 8/2000 | Reding et al. | 379/265.03 |
| 6,111,893 | A | 8/2000 | Volftsun et al. | 370/466 |
| 6,122,345 | A | 9/2000 | Johnson | 379/67.1 |
| 6,134,311 | A | 10/2000 | Ekstrom | 379/201 |
| 6,144,727 | A | 11/2000 | Mashinsky | 379/114.02 |
| 6,198,813 | B1 | 3/2001 | Pullen et al. | 379/201.01 |
| 6,233,316 | B1 | 5/2001 | Schier et al. | 379/88.03 |

FIG. 1

NGSN Data Distribution Network

**NGSN Provisioning System
Logical Software Architecture**

SERVICE PROVISIONING SYSTEM FOR INTERACTIVE VOICE RESPONSE SERVICES

CROSS-REFERENCE TO RELATED APPLICATIONS

This application is related to commonly-owned, co-pending applications filed concurrently herewith, entitled:

"Advanced Interactive Voice Response Service Node" having application Ser. No. 09/073,880, filed May 7, 1998;

"Telecommunications Architecture for Call Center Services Using Advanced Interactive Voice Response Service Nodes" having application Ser. No. 09/074,096, filed May 7, 1998;

"Interactive Voice Response Service Node with Advanced Resource Management" having application Ser. No. 09/074,142, filed May 7, 1998;

"Communications Signaling Gateway and System for an Advanced Service Node" having application Ser. No. 09/074,072, filed May 7, 1998;

"Call and Circuit State Machine for a Transaction Control Layer of a Communications Signaling Gateway" having application Ser. No. 09/073,885, filed May 7, 1998; and "System for Executing Advanced Interactive Voice Response Services Using Service-Independent Building Blocks" having application Ser. No. 09/073,887, filed May 7, 1998.

The above applications are incorporated herein by reference in their entirety.

BACKGROUND OF THE INVENTION

1. Field of the Invention

The present invention relates generally to computer telephony, and more particularly to an architecture for providing data to real-time processing nodes in a telecommunications network.

2. Related Art

Service node platforms that provide enhanced call services are common in the telecommunications industry. The modem trend is to design and implement modular service nodes that can be placed anywhere throughout a telecommunications network. A common example of a service node is an Interactive Voice Response (IVR) service node. It is common for a business, that is a customer of a telecommunications service provider, to use IVR services in conjunction with call center services. Interactive Voice Response service nodes are commonly used For customer call center routing. They perform processing of customer applications, based on one or more criteria selected by the customer, such as the dialed number of a call, Dialed Number Identification Service (DNIS), Automatic Number Identification (ANI), time of day, caller-entered digits, geographic point of call origin, etc. Interactive Voice Response service nodes can also perform other IVR services such as automated servicing of callers for customers, caller surveys, telemarketing, and call parking until a call center has an available resource (e.g., a customer service agent).

Conventional IVR service nodes require specialized architectures as customers demand more customized IVR applications. Consequently, different types of IVR service nodes are implemented throughout a telecommunications network to handle different customer's IVR applications. This results in an inefficient network because a call needing a certain application must be routed to a certain IVR service node irrespective of that node's current load. Therefore, a next generation of service nodes (NGSN) will be designed to provide customized services for many different customers, all on a common platform.

Consequently, the next generation of IVR service nodes will be complex computing platforms containing extensive software designed to perform a great number of functions. There will be much redundancy built into the NGSN node network. Every IVR service will be deployed on at least two different nodes, and most services will be deployed on more than two nodes for both increased reliability through redundancy and increased efficiency of the network (calls can then be routed to the nearest NGSN node). In addition, each node will include at least two completely redundant application servers. Each application server in a node must receive the exact same IVR services.

IVR services that will be deployed include both application and data files. Application files are the programs executed by NGSN application servers to service a call, and data files contain the data used by one or more applications. Data files include audio files for voice recordings and data for specific customer applications (e.g., account numbers, menu options, dealer locations, etc.).

Therefore, a problem is presented in that the service provider must keep applications and data among multiple application servers synchronized. What is needed is a node provisioning system capable of constant and frequent distributions of new applications and data, and in the face of problems such as some nodes being inoperative ("offline") while others are operational ("online").

SUMMARY OF THE INVENTION

The present invention is directed to a system to provision application and data files to a plurality of real-time processing nodes within a telecommunications network. The system includes a user interface for providing a user with control of the provisioning process via displays and status messages, an interface to a service creation environment (SCE) where the application and data files are created and a database for storing the application and data files. The system also includes configuration management of the application and data files.

The method of the present invention includes the steps of receiving the application and data files from a SCE and storing the application and data files on an application database. The method then receives a command from a user interface, verifies the: command, and analyzes the task to be performed as a result of the command. The method continues by distributing the application and data files to the plurality of real-time processing nodes and maintaining a plurality of state tables to reflect: the state of the application and data files after each of the method's steps.

An advantage of the present invention is that by centralizing the creation and distribution of application and data files among the network of real-time processing nodes, the data among the nodes is kept uniform.

Another advantage of the present invention is that the use of state tables and a queue manager allows a user to deploy, activate and deactivate IVR services among a plurality of advanced IVR service nodes in a network while maintaining data integrity among the nodes and configuration management of the multiple files for different IVR applications.

Yet still, another advantage of the present invention is that it provides the user with a very simple, high-level command set to perform complex provisioning functions through the use of a graphical user interface. Further features and advantages of the present invention as well as the structure and operation of various (embodiments of the invention are described in detail below with reference to the accompanying drawings.

BRIEF DESCRIPTION OF THE FIGURES

The present invention will be described with reference to the accompanying drawings, wherein.

DETAILED DESCRIPTION OF THE PREFERRED EMBODIMENTS

Overview

The present invention is directed to a provisioning system to be used in a telecommunications network for providing call center services which uses advanced interactive voice response (IVR) service nodes. In a preferred embodiment of the present invention, a customer may have multiple call centers distributed geographically that serve different functions, but are accessed by a single toll-free number. A call to the toll free number requires that any number of varying IVR services be performed by applying a customer's customized IVR application. The advanced interactive service nodes that perform the IVR applications are referred to herein as next generation service nodes (NGSN).

A network using a plurality of NGSNs can determine which function a caller needs by prompting the caller for specific information, collecting that information from the caller, and determining which call center can perform the function needed. The objective is for a telecommunications provider to provide their customers with flexible and reliable IVR services using a highly efficient network of NGSNs.

Therefore, the present invention provides a centralized provisioning system for IVR service networks and the like. The present invention's data-driven approach ensures the distribution of application and data files is uniform, and that all IVR application servers are kept synchronized.

The present invention is described in terms of the above described exemplary environment. This is for convenience only and is not intended to limit the scope of the application of the present invention. In fact, after reading the following description, it will be apparent to one skilled in the relevant art how to implement the following invention in alternate embodiments.

Telecommunications Network Architecture

Figure 1:
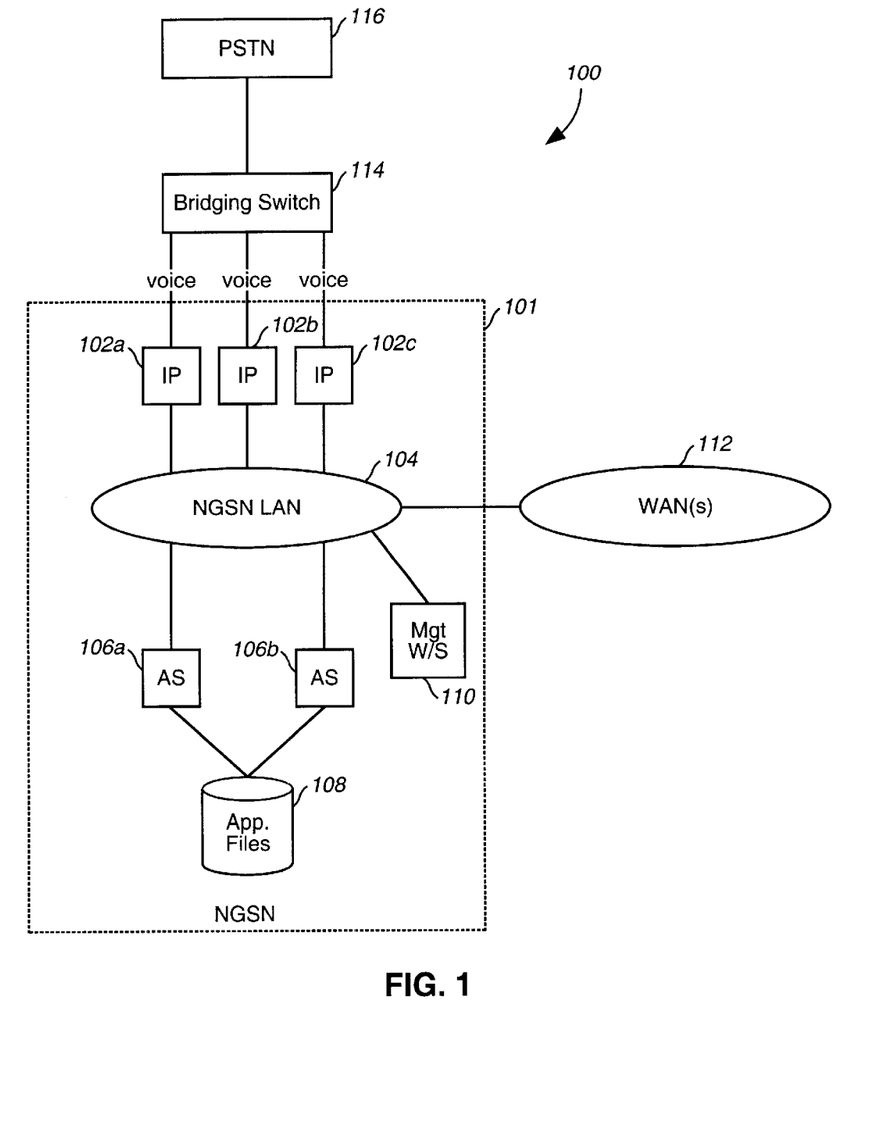
FIG. 1 is a block diagram illustrating an architecture of a telecommunications network in which a preferred embodiment of the present invention could be used.

FIG. 1 is a block diagram illustrating a telecommunications network architecture 100 in which a preferred embodiment of the present invention may be used. Network architecture 100 uses a next generation service node (NGSN) 101 to perform IVR services. The NGSN 101 is a computing and telephony platform that operate s as an IVR service node in a telecommunications network. It includes a pair of redundant application servers 106 (shown as "AS" 106a and 106b), a shared disk array 108, and a plurality of intelligent peripherals 102 (shown as "IP" 102a–102c).

The intelligent peripherals 102 are computers with telephony ports whose general purpose is to receive calls from the network, provide voice responses to callers, and collect caller input via dual tone multi-frequency (DTMF) signals or voice recognition. In a preferred embodiment, the intelligent peripherals 102 are built using DEC Alpha Voice 1000 computers and the application servers are built using DEC Adpha 8400 computers available from Digital Equipment Corporation of Maynard, Mass.

Customer IVR applications reside as command files on the shared disk array 108. When a call is received, an application server 106 calls the appropriate customer application. The functions of the intelligent peripherals 102 are controlled by applications on the pair of redundant application servers 106. The customer application specifies high level functions to be performed. The application server 106 calls on service-independent subroutines to perform various functions. This results in commands and files being sent to the particular intelligent peripheral 102 handling the call. The intelligent peripheral 102, in response, plays an audio file for a caller and collects caller input.

Further details on the execution of the service-independent subroutines to process calls to the NGSN platform 101 and the creation of customer application files are described in a commonly-owned, co-pending application filed concurrently herewith, entitled "System for Executing Advanced Interactive Voice Response Services Using Service-Independent Building Blocks" having application Ser. No. 09/073,887 which is incorporated herein by reference in its entirety.

The intelligent peripherals 102 and application servers 106 are connected to a NGSN local area network (LAN) 104, which in a preferred embodiment is comprised of a gigabit Ethernet switch or a FDDI switch. The NGSN LAN 104 is connected to a wide area network (WAN) 112, which in a preferred embodiment is an Etlernet WAN. While only one NGSN platform 101 is shown in FIG. 1 for ease of explanation, WAN 112 allows multiple NGSN platforms 101, as well as the provisioning system of the present invention, to be connected via a single network.

Also connected to the NGSN LAN 104 is a node monitoring and alarming (a.k.a. management) workstation ("Mgt W/S") 110. Management workstation 110 collects and stores alarms generated by the application servers 106 and the intelligent peripherals 102, and provides a user interface to these alarms. It also forwards alarms over the WAN 112. The management workstation 110 serves as a central collection point of all alarms generated on the NGSN 101, and forwards them to a central collection point of all alarms generated by the plurality of possible NGSN platforms 101 located on a network connected via WAN 112.

The intelligent peripherals 102 connect to a network bridging switch 114 via T1 voice trunks. The bridging switch 114 provides access to a Public Switched Telephone Network (PSTN) (referred to as "switch network") 116. In a preferred embodiment, bridging switch 102 is a Northern Telecom DMS-250 digital matrix switch that supports Release Link Trunk (RLT) voice connections to the NGSN 101 and is well known in the relevant art.

An NGSN platform 101 architecture and functionality are described in further detail in a commonly-owned, co-pending application filed concurrently herewith, entitled "Advanced Interactive Voice Response Service Node" having application Ser. No. 09/073,880. Furthermore, an architecture for a telecommunications network using NGSN 101 is described in detail in a commonly-owned, co-pending application filed concurrently herewith, entitled "Telecommunications Network Architecture for Call Center Services using Advanced Interactive Voice Response Service Nodes" having application Ser. No. 09/074,096. Both commonly-owned, co-pending applications are incorporated herein by reference in their entirety.

Provisioning System Data Distribution Network

Figure 2:
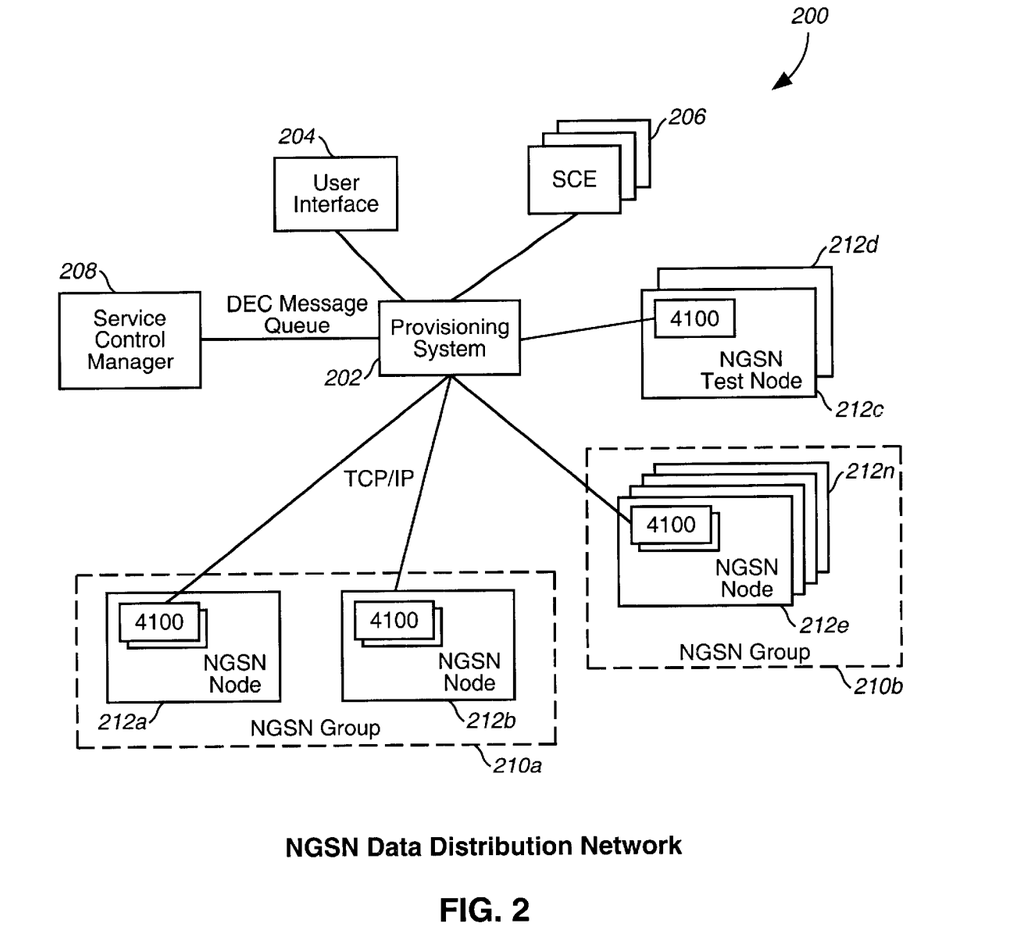
FIG. 2 is a block diagram illustrating the data distribution network of a provisioning system according to a preferred embodiment of the present invention.

FIG. 2 is a block diagram illustrating a provisioning system data distribution network 200 according to a preferred embodiment of the present invention. The provisioning system 202 includes two redundant servers (one primary, one secondary) running in "hot failover" mode. The architecture for one server is shown in, and will be described below with reference to, FIG. 3.

In a preferred embodiment, the provisioning system 202 is built on a standard mid-range server such as the DEC Alpha 4100. It has a standard user interface 204 which includes a keyboard, mouse, and monitor, and provides a graphical user interface (GUI) for inputting user commands and displaying messages to the user.

A service creation environment (SCE) 206 is a computing platform that includes one or more PC-based workstations, equipped with specialized software and a GUI used to create and modify IVR applications and data. Once an application or audio file is newly created, it may be distributed to each NGSN node 212 via the provisioning system 202. New applications and data are downloaded from an SCE 206 workstation to the Provisioning System 202, which communicate with each other via any (proprietary or non-proprietary) messaging protocol using Transmission Control Protocol/Internet Protocol (TCP/IP) and file transfer protocol (FTPP) over the WAN 112.

By centralizing the SCE 206, the overall network architecture 100 containing the NGSN 212 nodes is highly scaleable because additional NGSN 212 nodes may be added, and subsequently receive all customer applications and data via the provisioning system 202. FIG. 2 reflects the fact that the NGSN nodes 212 may be deployed in network 100 and configured into NGSN groups 210. Furthermore, each NGSN node 212 may be a test node (e.g., node 212c) or a functional production node (e.g., node 212a). Nevertheless, the provisioning system 202 distributes application files, data files, activation commands, deactivation commands, and other commands (e.g., deploy and delete commands) to the plurality of NGSN nodes 212a–n. This may also be done with any (proprietary or non-proprietary) messaging protocol using TCP/IP and FTP over the WAN 112.

A service control manager (SCM) 208 is a system that monitors and tracks the current states of the NGSN nodes 212. If an entire NGSN node 212 or a particular application server 106 becomes inoperative (i.e., offline), the SCM 208 may be queried for this status. The provisioning system 202 uses the SCM 208 to determine if an NGSN node 212 or application server 106 is online prior to deploying applications, data, or commands to it. In a preferred embodiment, the provisioning system 202 uses the DEC-messageQ™ interface product to communicate with the SCM 208.

Provisioning System Architecture and Operation

Figure 3:
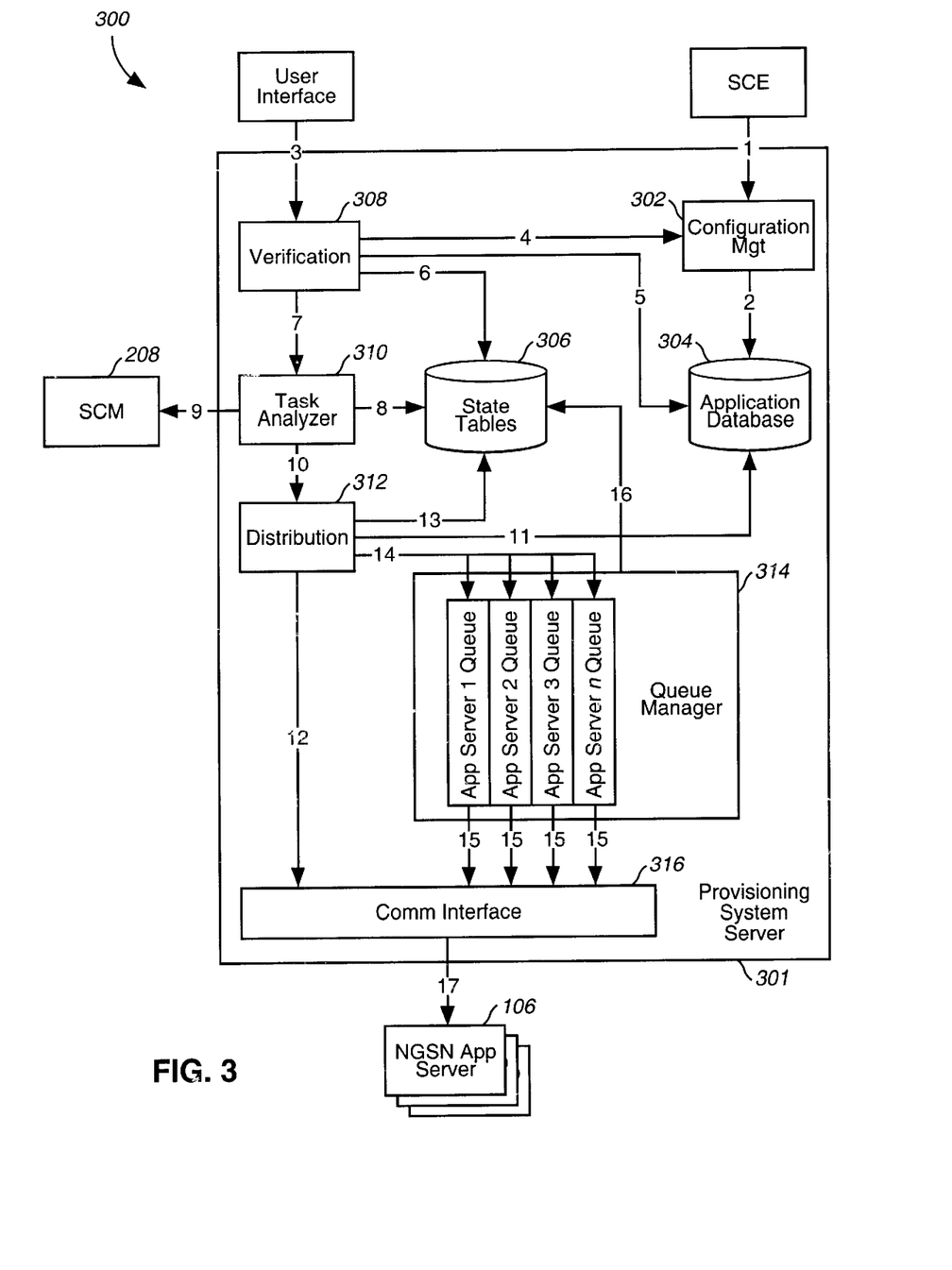
FIG. 3 is a block diagram illustrating a logical architecture of a provisioning system server according to a preferred embodiment of the present invention.

FIG. 3 is a block diagram illustrating a logical architecture 300 for the provisioning system server. The interfaces of logical architecture 300 are numbered for identification purposes only and are not intended to reflect any specific sequential process flow.

A provisioning system server 301 is designed to provide control of the provisioning process to the user, and thus is equipped with user interface 204. The provisioning system server 301, via user interface 204, accepts user commands and provides the user with displays of provisioning status and messages.

Once the SCE 206 is used to build applications, they may be downloaded to the provisioning system server 301 via interface (1). All data (i.e., the application and data files) that will eventually be deployed (i.e., "provisioned") to NGSN nodes 212 are stored in an application database 304. The SCE 206 and the SCE user are responsible for downloading applications and data to the provisioning system server 301. The provisioning system server user, via the provisioning system server's user interface 204, is responsible for initiating and controlling the process of provisioning the NGSN nodes 212 with those applications and data.

A configuration management (CM) process 302 is used to update the application database 304 with new applications and data from the SCE 206, manage and track the different versions of each, and perform standard CM functions. This is done via interface (2).

The application database 304 includes a database and database server process, or a database management system. It stores all applications and data files that are to be deployed to NGSN nodes 212. Applications are specific customer IVR applications, while data files include audio files for voice recordings, data for specific customer applications (account numbers, menu options, dealer locations, etc.), and data specific to the IVR service provider (identification and configuration of NGSN nodes 212 within network 100, etc.). When an application is stored, it is assigned an application identification number, which is provided back to the SCE 206 workstation that submitted the application. Since multiple SCE 206 workstations may be submitting applications, assignment of application identification numbers is a task performed by the provisioning system server 301.

The provisioning system server 301 utilizes a collection of state tables 306 to maintain the current provisioning states of applications. These states include the building and submitting of applications, the deployment and activation of applications on testing nodes, the completion of testing, and the deployment and activation of applications on production nodes. State transitions are triggered by processes that perform actions on applications. These include a task analyzer 310, a distribution process 312, and a queue manager 314. The state tables 306 are a key component used by the provisioning system 202 to ensure data integrity and synchronization among the multiple applications distributed among the multiple NGSN application servers 106 located on the plurality of NGSN nodes 212.

A verification process 308 receives user commands from the user interface 204 via interface (3). Commands include functions for deploying applications and data, activating/deactivating applications, deleting application and data files, and other functions for both test NGSN nodes (e.g., node 212d) and production NGSN nodes (e.g., node 212a). An exemplary list of thirty-two commands (grouped into nine categories) for the provisioning system 200 (and thus user interface 204) is shown in Table 1.

TABLE 1

| Command Category | Command Name | Command Use |
|---|---|---|
| Test PIN | Create Test PIN | Creates a Test PIN |
| | Update Test PIN | Updates Test PIN |
| | Delete Test PIN | Deletes Test PIN |
| TNT Definition | Create Corporate TNT Definition | Enters take back and transfer (TNT) definitions into the database. E.g., activation codes and definition of TNT extensions |
| | Update Corporate TNT Definition | Updates TNT definitions in the database |
| | Delete Corporate TNT Definition | Deletes TNT definition |
| NGSN Database | Create NGSN Database | Creates an NGSN database |
| | Bulk load NGSN Database | Up-loads a formatted file into a named NGSN database |
| | Bulk Update NGSN database | Up-loads a formatted file into a named NGSN database. The data overwrites any existing data |
| | Update NGSN Database data | Allows single record creation, update, and delete within an NGSN database |
| | Delete NGSN database data | Deletes an entire NGSN database |
| Audio Update | Deploy Audio | Deploys an audio update |
| | Remove Audio | Removes an audio file |
| | Purge Audio | Removes an audio file from all nodes 212 and the provisioning system 202. |
| Application Deployment | Deploy application to test | This action moves a version of an application to the test node (e.g., node 212c). |
| | Activate application on test | This action activates a version of an application to test node. |
| | Deactivate application on test | This action activates a version of an application to the test node. |
| | Approve application for deployment | This action indicates test node testing is complete for a version of an application and enables the application version to be deployed to a node 212 or group 210. |
| | Deploy application to Group/Node | This action physically moves the data necessary for an application version to a group 210 or single node 212. |
| | Activate application in Group/Node | Activate changes the status of an application version so that it can begin servicing calls. |
| | Deactivate application in Group/Node | Deactivate changes the status of an application version so that it will no longer service calls on a group 210 or node 212. |
| | Remove application from group/node | Removal is used to remove application version data on nodes 212 in the field. Removal does not remove application version data from the provisioning system 202. |
| | Purge application | Purge removes application version data from all nodes 212 in the system and from the provisioning system 202. |
| TNT Deployment | Deploy TNT Defn to Test | Deploys TNT Definition data to test node |
| | Deploy TNT Defn to Group/Node | Deploys TNT Definition data to group 210 or node 212. |
| | Remove TNT Defn from Group/Node | Removes TNT Definition data from group 210 or node 212. |
| NGSN DB Deployment | Deploy NGSN DB Data to Test | Deploys NGSN DB data to test node. |
| | Deploy NGSN DB Data to Group/Node | Deploys NGSN DB data to group 210/node 212. |
| | Remove NGSN DB Data from Group/Node | Removes NGSN DB data from group 210/node 212. |
| Test PIN Deployment | Deploy Test PIN | Deploys Test PIN to test node. |
| Configuration Commands | Create Group | Creates a failover group 210 to maintain synchronization across multiple sites within a group. |
| | Create Node | Creates a node 212 and assigns it to a group 210. |

In a preferred embodiment, the user interface 204 is a GUI, the software for which is provided on the provisioning system server 3 01. Verification process 308 performs edits on user commands. It then checks the CM process 302, via interface (4), to determine which version of the application or data file stored in the application database 304 needs to be acted on in order to perform a user command. The verification process 308 then reads the application database 304, via interface (5), to confirm that all of the needed application and data files exist. There may be several files that are needed for a single user command.

The verification process 308 then reads the state tables 306, via interface (6), for the needed application(s) to confirm that the application version and data files are in the proper state for performing the command. For example, if the command is to "activate application in node," the verification process 308 reads the state tables 306 to ensure that the application is already deployed and that all the files needed for the application to properly execute are also deployed. Alternately, if a command is to "remove NGSN DB data from node," the state tables 306 may indicate that another active application is using that data file, and therefore the data file cannot be currently deleted. Verification process 308 then passes all verified commands to the task analyzer 310 via interface (7).

The task analyzer 310 receives simple user commands from the verification process 308, and determines the individual low-level system tasks that are needed to implement the commands. This enables the provisioning system server 301 to provide the user with a very simple, high-level command set (see Table 1) to perform complex functions. A user command to deploy an application, for example, may be parsed into 35 or 40 different low-level commands (due in part to the distribution of applications among multiple NGSN application servers 106). The task analyzer 310 reads the state tables 306, via interface (3), to determine which low-level commands are needed based on current the states of the applications.

Task analyzer 310 also determines which of the redundant application servers 106 on which of the plurality of NGSN nodes 212 is to receive each command. It utilizes the SCM 208, via interface (9), to determine if an NGSN node 212 and application server 106 is currently operational (i.e., online or offline) prior to provisioning. If an application server 106 is offline, messages for that application server 106 will be placed in a queue within queue manager 314 until the application server 106 is back online.

Distribution process 312 receives distribution commands for individual application/data files for individual NGSN application servers 106 from the task analyzer 310 via interface (10). Commands from the distribution process 312 may be utilized to deploy applications and data, activate or deactivate an application, modify an application, configure a service, etc. Distribution process 312 retrieves the appropriate application and data files from the application database 304, via interface (11), and then bundles them with the distribution commands into distribution messages. It sends the distribution messages to a communications interface 316 via interface (12). The communications interface 316 sends the distribution messages to the various NGSN application servers 106 via TCP/IP and FTP over the WAN 112 (shown as interface (17) in FIG. 3).

The distribution process 312 also sets time-outs for responses and updates the state tables 306, via interface (13), to indicate whether or not the applications and data successfully deployed, activated, deactivated, or otherwise accomplished whatever the distribution message commanded.

If an initial deployment of a distribution message to an application server 106 fails, or the distribution process 312 receives a command from the task analyzer 310 indicating that an application server 106 is currently offline but needs a distribution message, the distribution process 312 places (via interface (14)) the distribution message in a queue within queue manager 314 for that application server 106.

Queue manager 314 monitors the application server 106 message queues and maintains a first-in, first-out (FIFO) message flow for each application server 106. This ensures that distribution messages are deployed in the same order as they were received from the task analyzer 310. This is important to ensure integrity in the provisioning process. For example, if the task analyzer 310 first provides a deployment command for an application, and then provides an activation command for that application, the deployment command (which contains the application files) must be distributed first.

The queue manager 314 sends distribution messages to the communications interface 316, via interface (15), for distribution to NGSN nodes 212 via the WAN 112. If an application server 106 was previously offline, before coming online, it must first retrieve all distribution messages waiting for it in its queue. The queue manager 314 also updates the state tables 306, via interface (16), to indicate the results of the completion of distribution messages.

For example, if an "activate application in node" message deploys successfully to one application server 106 at a NGSN node 212 but fails to deploy to the other, the distribution process 312 updates the state tables 306 to show this (or the queue manager 314 updates the state tables 306 if the queue manager 314 sent the message). The verification process 308 reads this in the state tables 306, and provides the user interface 204 with a message indicating that the message deployed successfully to one application server (e.g., 106a) but failed to deploy to the other (e.g., 106b), and thus the two application servers 106 are not synchronized. The user may then issue a "deactivate application in node" command for the application server 106 on which the "activate application in node" message successfully deployed, so that the two application servers 106 will now be synchronized. Alternately, this process may be automated by programming it into the verification 308, task analyzer 310, and/or distribution 312 processes. In a preferred embodiment, however, this process is left to manual operation in order to provide more control to the user.

Detailed Example of Provisioning System

Figure 4:
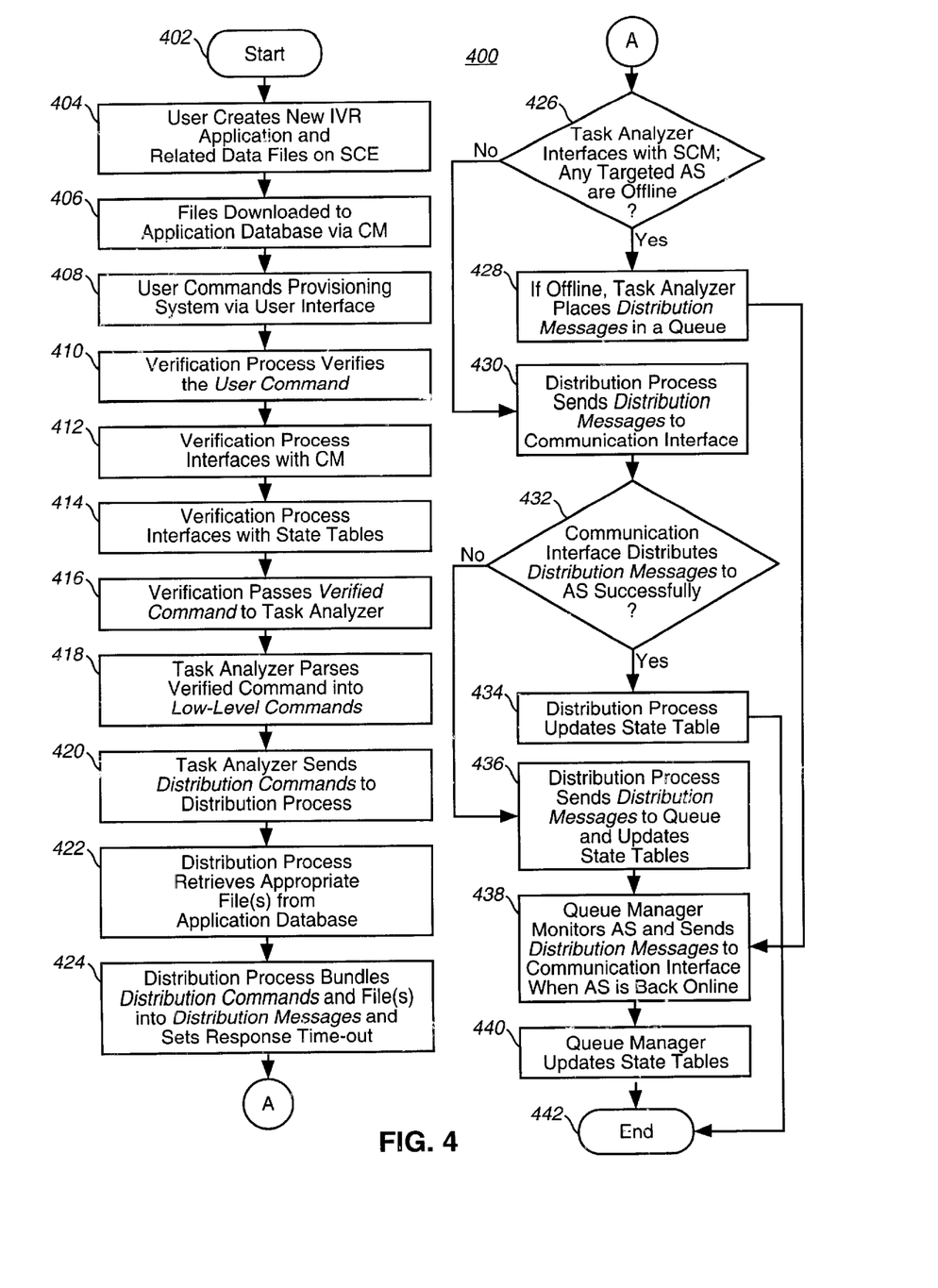
FIG. 4 is a flowchart illustrating an example of a provisioning system in operation according to the present invention.

FIG. 4 illustrates a provisioning system flowchart 400 reflecting the operation of the provisioning system 200 as explained above with reference to FIG. 3. Flowchart 400 begins at step 402 with control passing immediately to step 404. In step 404., a user creates a new IVR application and related data files on the SCE 206. In step 406, the files are downloaded to the provisioning system's application database 304 via the CM process 302.

In step 408, the user issues a command (from Table 1) to the provisioning system 200 via the user interface 204 GUI. In step 410, the verification process 308 verifies the user command by checking all external dependencies of the command. For example, before an "activate application in node" command is executed, the verification process 308 would ensure all components within network 100, but external to provisioning system 202 (e.g., databases, etc.), were operational. The verification process 308 then interfaces with the CM process 302, in step 412, to determine which version of the application and data files needs to be acted upon. In step 414, the verification process 308 interfaces with the state tables 306 to ensure the application version and data files are in the proper state to perform the command requested by the user.

In step 416, the verification process 308 passes the verified command to the task analyzer 310. In step 418, the task analyzer 310 parses the verified command into several low-level commands. In step 420, the task analyzer 310 sends the distribution commands to the distribution process 312.

In step 422, the distribution process 312 retrieves the appropriate file(s) from the application database 304. In step 424, the distribution process 312 bundles the distribution commands and file(s) into distribution messages and sets the response time-out. In step 426, the task analyzer 3 10 interfaces with the SCM 208 to determine if the targeted application server 106 is offline (i.e., inoperative). If it is offline, the task analyzer 310 causes the distribution messages to be sent to the queue manager 314, in step 428, and then proceeds to step 438 as will be described below. Alternately, if the targeted application server 106 is online (i.e., operational), the distribution process 312 sends the distribution messages to the communication interface 316 in step 430. In step 432, the communication interface 316 distributes the distribution messages to the targeted NGSN application server 106. If successful, the distribution process 312 updates the state tables 306 in step 434. The provision process 400 is then completed at step 442.

However, if step 432 is unsuccessful, the distribution process 312 sends the distribution messages to the appropriate queue within queue manager 314 and updates the state tables 306 in step 436. Then, in step 438, the queue manager 314 monitors the targeted application server 106. It then sends the stored distribution messages to the communication interface 316 when the targeted application server 106 is back online. In step 440, the queue manager 314 updates the state tables 306 to indicate the results of the distribution messages sent to the application server 106 after it has come back online. The provisioning process 400 is then completed at step 442.

Alternative Provisioning System Embodiment

Figure 5:
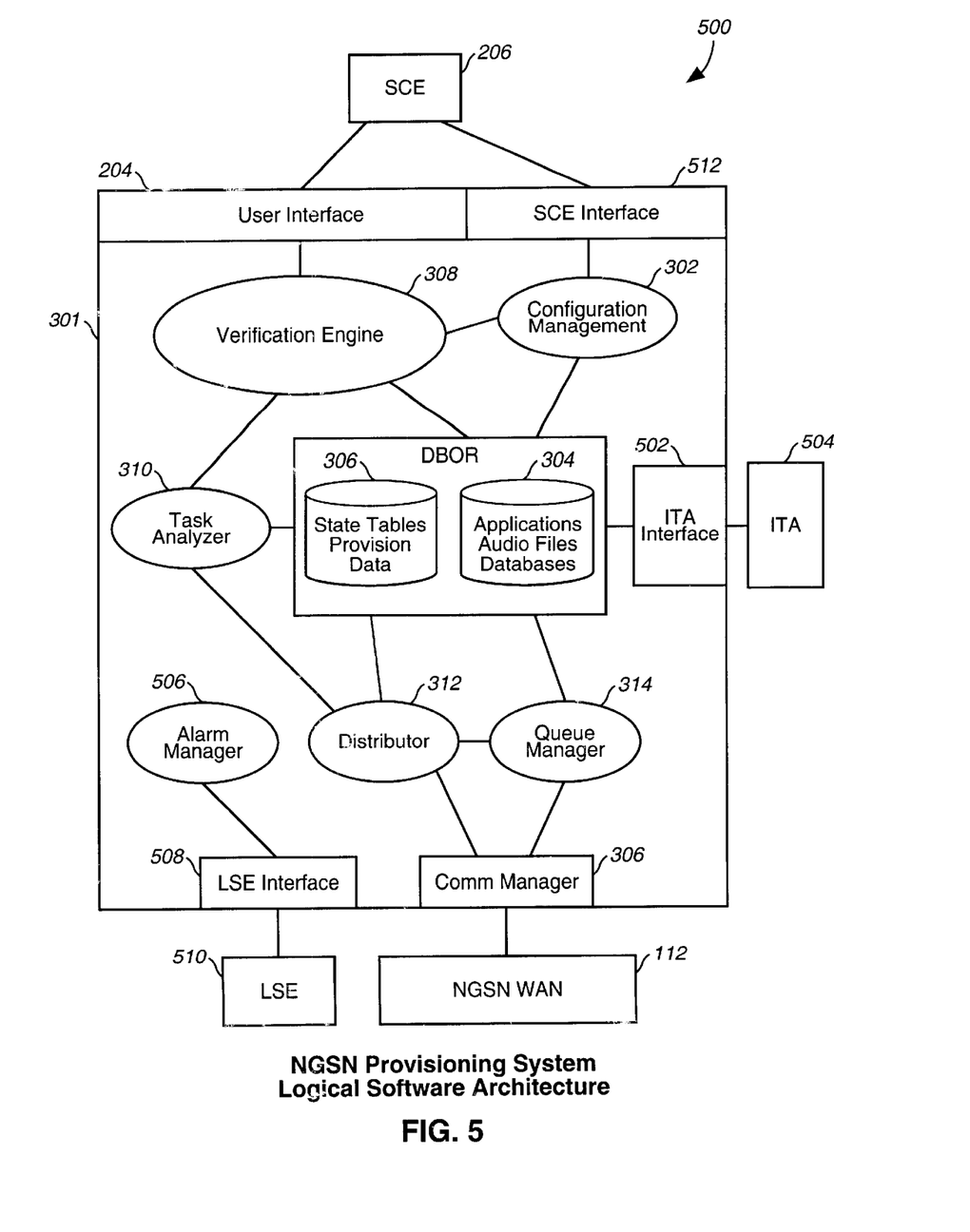
FIG. 5 is an architecture diagram illustrating additional features of the present invention.

FIG. 5 is an architecture diagram 500 illustrating additional features which may be added to provisioning system server 301 of the present invention. These additional features are interfaces in addition to, for example, interface 512 to the SCE 206 mentioned previously. For example, an interface 502 to an Inbound Traffic Allocator (ITA) system 504 may be added to the application database 304. The ITA system interacts with any service control points (SCPs) located within network 100. While switches perform routing of dial-1 calls, a SCP determines routing for special service calls, such as toll-free 800/888 and Virtual Private Network (VPN) calls and may also be used in routing translations for Local Number Portability. The use of SCPs within a telecommunications network is well known in the relevant art.

The ITA 504 dynamically updates routing on the SCPs by determining current loads to each NGSN node 212, accepting user input via the provisioning system server 301 that specifies how inbound traffic should be allocated to each node 212, and then sending routing updates to the SCPs via the SCM 208. In this way, the allocation of inbound traffic to each of the multiple NGSN nodes 212 within network 100 may be modified dynamically based on user input via the provisioning system 202.

Another feature shown in FIG. 5 is an alarm manager process 506 and interface 508 to a Local Support Element (LSE) 510. An LSE 510 receives alarms generated by various network 100 elements, and provides a point of concentration for these alarms for distribution to downstream systems. Each network 100 element, including the NGSN nodes 212 and the provisioning system server 301, has an alarm manager process which collects alarms generated on the computer that embodies the network 100 element (e.g, workstation 110 shown in FIG. 1). These alarms may be generated by the computer's operating system or application software. The alarm manager 506 collects these alarms for the provisioning system 202, logs them, and then sends them to the LSE 510 via the WAN 112.

Further details on a telecommunications network architecture which includes a plurality of NGSNs 101 and various other network components are described in a commonly-owned, co-pending application filed concurrently herewith, entitled "Telecommunications Architecture for Call Center Services Using Advanced Interactive Voice Response Service Nodes" having application Ser. No. 09/074,096 which is incorporated herein by reference in its entirety.

Environment

Figure 6:
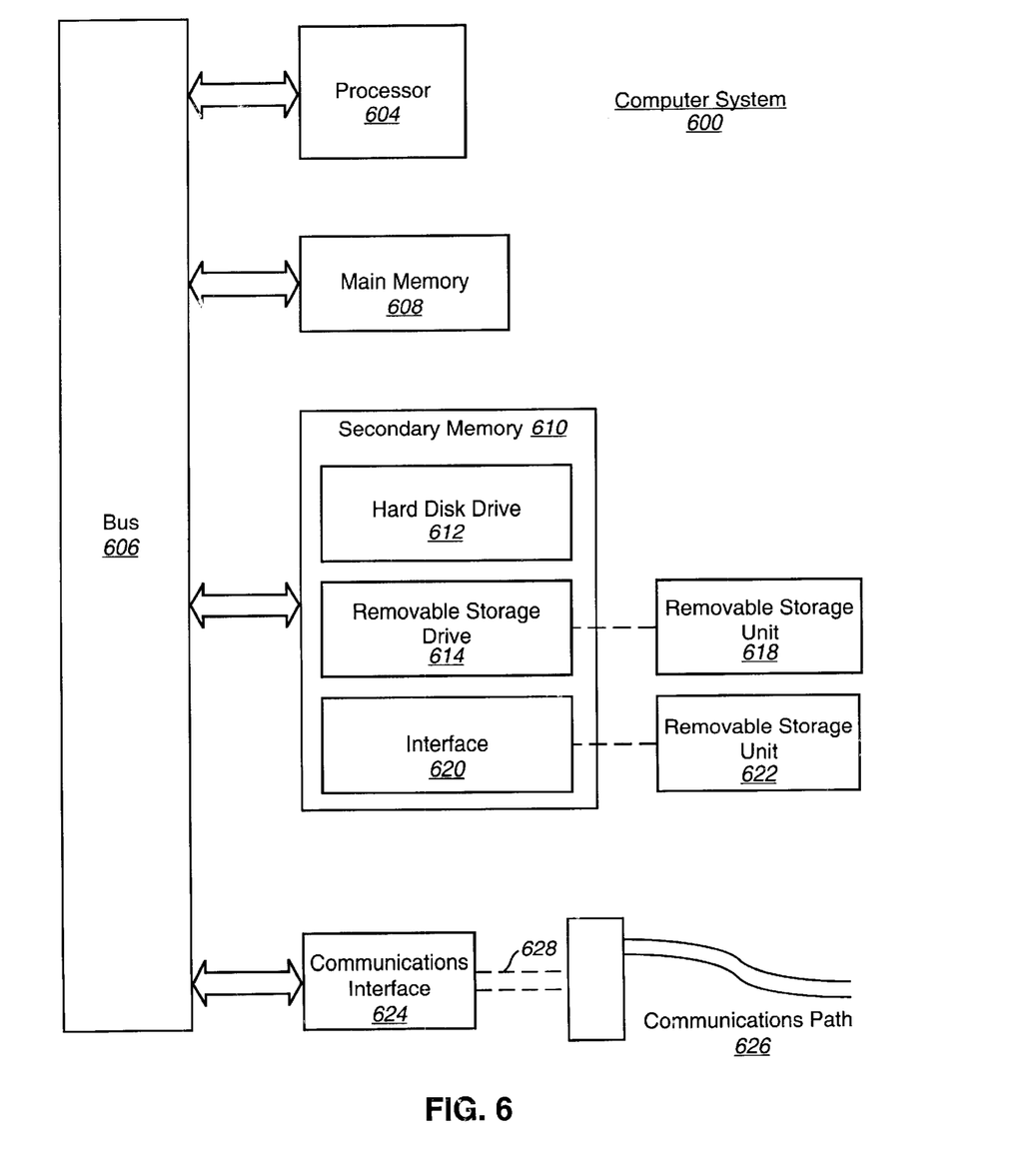
FIG. 6 is a block diagram illustrating an exemplary computer for implementing the present invention.

The present invention may be implemented using hardware, software or a combination thereof and may be implemented in a computer system or other processing system. In fact, in one embodiment, the invention is directed toward a computer system capable of carrying out the functionality described herein. An example of a computer system 600 is shown in FIG. 6. The computer system 600 includes one or more processors, such as processor 604. The processor 604 is connected to a communication bus 606. Various software embodiments are described in terms of this exemplary computer system. After reading this description, it will become apparent to a person skilled in the relevant art how to implement the invention using other computer systems and/or computer architectures.

Computer system 600 also includes a main memory 608, preferably random access memory (RAM), and may also include a secondary memory 610. The secondary memory 610 may include, for example, a hard disk drive 612 and/or a removable storage drive 614, representing a floppy disk drive, a magnetic tape drive, an optical disk drive, etc. The removable storage drive 614 reads from and/or writes to a removable storage unit 618 in a well known manner. Removable storage unit 618, represents a floppy disk, magnetic tape, optical disk, etc. which is read by and written to by removable storage drive 614. As will be appreciated, the removable storage unit 618 includes a computer usable storage medium having stored therein computer software and/or data.

In alternate embodiments, secondary memory 610 may include other similar means for allowing computer programs or other instructions to be loaded into computer system 600. Such means may include, for example, a removable storage unit 622 and an interface 620. Examples of such may include a program cartridge and cartridge interface (such as that found in video game devices), a removable memory chip (such as an EPROM, or PROM) and associated socket, and other removable storage units 622 and interfaces 620 which allow software and data to be transferred from the removable storage unit 622 to computer system 600.

Computer system 600 may also include a communications interface 624. Communications interface 624 allows software and data to be transferred between computer system 600 and external devices. Examples of communications interface 624 may include a modem, a network interface (such as an Ethernet card), a communications port, a PCM-CIA slot and card, etc. Software and data transferred via communications interface 624 are in the form of signals 628 which may be electronic, electromagnetic, optical or other signals capable of being received by communications interface 624. These signals 628 are provided to communications interface 624 via a communications path (i.e., channel) 626.

This channel 626 carries signals 628 and may be implemented using wire or cable, fiber optics, a phone line, a cellular phone link, an RF link and other communications channels.

In this document, the terms "computer program medium" and "computer usable medium" are used to generally refer to media such as removable storage drive 614, a hard disk installed in hard disk drive 612, and signals 628. These computer program products are means for providing software to computer system 600.

Computer programs (also called computer control logic) are stored in main memory 608 and/or secondary memory 610. Computer programs may also be received via communications interface 624. Such computer programs, when executed, enable the computer system 600 to perform the features of the present invention as discussed herein. In particular, the computer programs, when executed, enable the processor 604 to perform the features of the present invention. Accordingly, such computer programs represent controllers of the computer system 600.

In an embodiment where the invention is implemented using software, the software may be stored in a computer program product and loaded into computer system 600 using removable storage drive 614, hard drive 612 or communications interface 624. The control logic (software), when executed by the processor 604, causes the processor 604 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s).

In yet another embodiment, the invention is implemented using a combination of both hardware and software.

Conclusion

While various embodiments of the present invention have been described above, it should be understood that they have been presented by way of example, and not limitation. It will be apparent to persons skilled in the relevant art that various changes in form and detail may be made therein without departing from the spirit and scope of the invention. Thus the present invention should not be limited by any of the above-described exemplary embodiments, but should be defined only in accordance with the following claims and their equivalents.

What is claimed is:

1. A system to provision application and data files to a plurality of service nodes within a telecommunications network, comprising:

a user interface for providing a user with control of the provisioning process via displays and status messages;

first interfacing means for interfacing to a service creation environment (SCE) where the application and data files are created;

managing means for performing configuration management of the application and data files;

a database for storing the application and data files;

verification means for verifying commands received from said user via said user interface;

a task analyzer for analyzing said commands received from said verification means;

communications interface means for interfacing to the service nodes, wherein each of said service nodes includes a network of a plurality of intelligent peripherals, an application server, and a storage device for storing a telecommunications application;

distribution means for distributing the application and data files to the service nodes, via said communications interface means, in response to commands from said task analyzer; and a service control manager (SCM) which tracks the state of the plurality of service nodes.

2. The system of claim 1, further comprising:

second interfacing means for interfacing said task analyzer to said SCM, wherein said SCM notifies said task analyzer which of the plurality of service nodes are currently functioning.

3. The system of claim 1, further comprising:

a queue manager which stores failed messages from said distribution means for each of the plurality of service nodes.

4. The system of claim 3, further comprising:

state tables for ensuring data integrity and synchronization of the application and data files distributed among the plurality of service nodes; and transitioning means for transitioning the state of said state tables based on the actions of said task analyzer, said distribution means, and said queue manager.

5. The system of claim 2, wherein the application and data files are interactive voice response (IVR) customer application files and the plurality of service nodes are IVR service platforms.

6. A system for provisioning application and data files to a plurality of advanced interactive voice response (IVR) service platforms within a telecommunications network, comprising:

a user interface for accepting commands from a user wherein said commands are to deactivate, activate, deploy, or delete the application and data files;

a database for storing tile application and data files;

monitoring means to monitor the operational state of the plurality of advanced IVR service platforms, wherein each of said advanced IVR service platforms includes a network of a plurality of intelligent peripherals, an application server, and a storage device for storing a telecommunications, application;

a plurality of state tables to monitor the state of the application and data files; and deploying means for deploying the application and data files to the plurality of advanced IVR service platforms according to said monitoring means, said plurality of state tables, and said commands received from said user interface.

7. The system of claim 6, further comprising:

a queue manager which stores messages for any of the plurality of advanced IVR service platforms that were offline thereby causing said deploying means to be unsuccessful.

8. The system of claim 7, further comprising:

an alarm manager for collecting alarms generated by said queue manager, said plurality of state tables, said database, said deploying means, and said monitoring means.

9. A method to provision application and data files to a plurality of service nodes in a telecommunications network, comprising the steps of:

(1) receiving application and data files from a service creation environment (SCE);

(2) storing said application and data files on an application database;

(3) receiving a command from a user interface, said command specifying a task;

(4) verifying said command;

(5) analyzing said task to identify a service node from among the plurality of service nodes, wherein each of said service nodes includes a network of a plurality of intelligent peripherals, an application server, and a storage device for storing a telecommunications application;

(6) distributing said application and data files to said service node; and (7) maintaining a state table to reflect the state of said application and data files in said service node.

10. The method of claim 9, wherein step (4) comprises the steps of:

(a) interlacing with a configuration management process to determine a version of said application and data files needed to perform said command; and (b) interfacing with said state table to ensure said version is in the proper state to perform said command.

11. The method of claim 10, wherein step (5) comprises the steps of:

(a) parsing said command into a series of low-level commands; and (b) generating a series of distribution commands from said series of low-level commands.

12. The method of claim 11, wherein step (6) comprises the steps of:

(a) retrieving said application and data files from said application database;

(b) bundling said series of distribution commands and said application and data files into distribution messages when said real-time processing node is determined to be online;

(c) setting a response time-out for said real-time processing node;

(d) interfacing with a service control manager (SCM) to determine whether said real-time processing node is offline;

(e) sending said distribution messages to a queue when said real-time processing node is determined to be offline;

(f) distributing said distribution messages to said real-time processing node when said real-time processing node is determined to be online; and (g) sending said distribution messages to said queue when step (f) is unsuccessful.

13. The method of claim 12, further comprising the steps of:

monitoring said real-time processing node when said distribution messages are placed in said queue; and distributing said distribution messages from said queue to said real-time processing node when said real-time processing node returns online.

14. A computer program product comprising a computer usable medium having computer readable program code means embodied in said computer usable medium for causing an application program to execute on a computer, that provisions application and data files to a plurality of service nodes within a telecommunications network, said computer readable program code means comprising:

a first computer readable program code means for causing the computer to provide a user with control of the provisioning process via displays and status messages;

a second computer readable program code means for causing the computer to provide interface to a service creation environment (SCE) where the application and data files are created;

a third computer readable program code means for causing the computer to perform configuration management of the application and data files;

a fourth computer readable program code means for causing the computer to store the application and data files;

a fifth computer readable program code means for causing the computer to verify commands received from said user via said interface;

a sixth computer readable program code means for analyzing said verified commands received;

a seventh computer readable program code means for causing the computer to interface to the service nodes, wherein each of said service nodes includes a network of a plurality of intelligent peripherals, an application server, and a storage device for storing a telecommunications application;

an eighth computer readable program code means for causing the computer to distribute the application and data files, via said seventh computer readable program code means, to the service nodes in response to commands from said sixth computer readable program code means; and a ninth computer readable program code means for causing the computer to interface to a service control manager (SCM) which tracks the state of the plurality of service nodes and notifies said sixth means which of the plurality of service nodes are currently functioning.

15. The computer program product of claim 14, further comprising:

a tenth computer readable program code means for causing the computer to interface to store failed messages from and said eighth computer readable program code means for each of the plurality of service nodes in a queue.

16. The computer program product of claim 15, further comprising:

an eleventh computer readable program code means for causing the computer to interface to ensure data integrity and synchronization of the application and data files distributed among the plurality of service nodes using state tables; and a twelfth computer readable program code means for causing the computer to transition the state of said state tables cased on the actions of said computer readable program code sixth means, said computer readable program code eighth means and said computer readable program code tenth means.

17. A system to provision application and data files to a plurality of service nodes within a telecommunications network, comprising:

a user interface for providing a user with control of a provisioning process via displays and status messages;

a provisioning system server for:

interfacing to a service creation environment (SCE) where the application and data files are created and distributing the application and data files to the service nodes in response to commands received from the user interface; and a service control manager (SCM) for tracking the state of the plurality of service nodes, wherein each of said service nodes includes a network of a plurality of intelligent peripherals, an application server, and a storage device for storing a telecommunications application.

18. A method for provisioning application and data files to a plurality of service nodes within a telecommunications network, comprising:

presenting a user interface to control a provisioning process via displays and status messages;

interfacing to a service creation environment (SCE) where the application and data files are created and distributing the application and data files to the service nodes in response to commands received from the user interface; and tracking the state of the plurality of service nodes, wherein each of said service nodes includes a network of a plurality of intelligent peripherals, an application server, and a storage device for storing a telecommunications application.

* * * * *